United States Patent Office 3,274,231
Patented Sept. 20, 1966

3,274,231
COMPOSITIONS AND METHODS OF STABILIZING UNSATURATED ORGANIC NITRILES
Tadahiro Kobayashi, Fuji-shi, Japan, assignor to Asahi Kasei Kogyo Kabushiki Kaisha, Osaka, Japan, a corporation of Japan
No Drawing. Filed June 13, 1963, Ser. No. 287,516
Claims priority, application Japan, Sept. 13, 1962, 37/39,410; Nov. 10, 1962, 37/50,472, 37/50,473; Jan. 30, 1963, 38/3,286; Apr. 10, 1963, 38/17,627
8 Claims. (Cl. 260—465.9)

This invention relates to a method for inhibiting the polymerization of polymerizable unsaturated organic monomers.

It is well known that polymerizable unsaturated organic monomers are denatured when they are transferred or stored at room temperatures or subjected to elevated temperatures, such as encountered during distillation of monomers.

It is also well known that stabilizers are added to the monomers in order to avoid such denaturation. However, it has also been experienced that polymers are colored when the polymer is made from the monomers containing stabilizers, t-butylcatechol, hydroquinon and p-methoxyphenol, for example, which are familiar stabilizers for acrylonitrile, acrylates or methacrylates reduce whiteness or the thermal stability in whiteness of polymers thereof, and sometimes they inhibit polymerization to adversely effect the polymerization yield and molecular weight distribution, even if they are contained in the monomers in a minor amount. Accordingly, the monomers should be thoroughly purified before they are polymerized, with the result that they require severe distillation and consequent loss of monomer.

It is an object of the present invention to provide new stabilizing agents for polymerizable unsaturated organic monomers which avoid denaturation of the monomers and do not color polymers obtained therefrom.

It is an other object of the persent invention to provide new stabilizing agents for polymerizable unsaturated organic monomers which give polymers superior thermal stability in whiteness, even if the statililzers remain therein.

It is a further object of the present invention to provide a method for stabilizing polymerizable unsaturated organic monomeric compounds.

According to the present invention, compounds represented by the general formula of

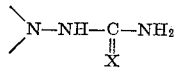

wherein X represents a sulphur or oxygen atom are admixed with polymerizable unsaturated, organic compounds.

The polymerizable, unsaturated organic compounds according to the invention are acrylonitrile and alkyl substituted compounds thereof, e.g., methacrylonitrile, dimethyl acrylonitrile, etc. The following compounds are also stabilized by the substances according to the invention but are the subjects of separate divisional applications SN 482,657, 582,658 and 482,659, acrylic acid and its alkyl substituted compounds thereof, e.g., methacrylic acid, methacrylic acid, etc., and alkyl esters of such acids, e.g., methyl methacrylate, ethylmethacrylate, butylmethacrylate, methylacrylate ethyl acrylate, propyl acrylate, butyl acrylate, etc.; and amides of such acids, e.g., acrylamide, methacrylamide, etc.; styrene and alkyl substituted compound thereof, e.g., p-methylstyrene, etc.; vinyl esters, e.g., vinyl acetate, vinyl propionate, etc.; vinyl and vinylidene halides, e.g., vinyl chloride, vinylidene chloride, etc.; vinyl compound containing sulfonic acid groups, e.g., vinyl sulfonic acid, methallyl sulfonic acid, p-styrene sulfonic acid, etc.; vinyl compounds containing basic nitrogen atom, e.g., 2-methyl-5-vinyl pyridine, 4-vinyl pyridine and N,N-diethylaminoethylmethacrylate.

The compounds to be added includes acetonethiosemicarbazone, acetaldehydethiosemicarbazone, acetophenonethiosemicarbazone, actylthiosemicarbazole, phenylthiosemicarbazide, formylthiosemicarbazide, carbaminylthiosemicarbazide, thiosemicarbazide, acetonesemicarbazone, acetaldehydesemicarbazone, acetophenonesemicarbazone, acetylsemicarbazide, semicarbazide, phenylsemicarbazide and iononesemicarbazone.

The stabilizer compounds may be used in an amount of 0.5 to 2000 p.p.m., preferably 1–50 p.p.m.

These stabilizers produce no adverse effects when monomers having the stabilizers are subjected to polymerization in the presence of peroxide or redox type catalysts.

EXAMPLE 1

In order to show the effectiveness of the present inhibitors in comparison with other known inhibitors a test was carried out in which acrylonitrile containing the inhibitors to be compared was subjected to the oxygen bomb test, which is conventionally employed for determining the stability of gasoline in the presence of oxygen at high pressures. This test was carried out as follows:

Using a graduated cylinder, 25 ml. of acrylonitrile containing the inhibitor was introduced into the glass liner. The liner was placed in the stainless steel bomb, connected to a pressure recording guage and the bomb was closed tightly. Oxygen was added to a pressure of 100 pounds per square inch gauge at room temperature. The bomb was placed in a steam bath and the pressure characteristics were noted over a four-hour period.

As the bomb becomes heated, the pressure rises gradually to about 140 pounds per square inch gauge. If the sample is potentially unstable, the pressure, after levelling off, will drop, then increase rapidly, and the acrylonitrile will become a solid polymer. If no sudden pressure drop is noted, and if no solid polymer is formed during the four-hour test period, the inhibitor is considered satisfactory.

The above test was applied to acrylonitrile containing the following inhibitors. Tertiary butyl catechol, hydroquinone monomethyl ether, thiosemicarbazide, acetaldehydethiosemicarbazone, acetonethiosemicarbazone, acetophenonethiosemicarbazone, semicarbazide, acetonesemicarbazone, acetaldehydesemicarbazone. The table mentioned hereinunder shows the concentrations as well as the effect upon the acrylonitrile.

*Comparison of inhibitors*

| Inhibitor | Concentration | Result |
|---|---|---|
| Tertiary butyl catechol | 100 p.p.m. | sample polymerized. |
| Hydroquinone monomethyl ether | 10 p.p.m. | sample polymerized. |
| Hydroquinone monomethyl ether | 20 p.p.m. | no polymer formed. |
| Thiosemicarbazide | 5 p.p.m. | no polymer formed. |
| Acetaldehydethiosemicarbazone | 4 p.p.m. | no polymer formed. |
| Acetonethiosemicarbazone | 4 p.p.m. | no polymer formed. |
| Acetophenonethiosemicarbazone | 4 p.p.m. | no polymer formed. |
| Semicarbazide | 8 p.p.m. | no polymer formed. |
| Acetonesemicarbazone | 8 p.p.m. | no polymer formed. |
| Acetaldehydesemicarbazone | 8 p.p.m. | no polymer formed. |

The above data show that the inhibitors according to the present invention are effective at lower concentrations than the conventional inhibitors of the prior art. In addition to this superiority in that a smaller amount of the inhibitors is necessary, the present inhibitors have the further advantages of negligible color formation. In addition to the above accelerated stability test carried out in the presence of oxygen at elevated temperatures and high pressures, it has been found that the present inhibitors are effective in prolonged storage under normal atmospheric conditions.

Acrylic fibre was prepared by polymerizing acrylonitrile (containing the inhibitor), without removing the inhibitor, dissolving in 55–80% nitric acid. The thermal stability in whiteness of the acrylic fibres thus prepared were very good and showed negligible color formation.

EXAMPLE 2

In order to show the effectiveness of the present inhibitors in comparison with other known inhibitor a test was carried out in which acrylic esters, such as methylacrylate, ethyl acrylate and butyl acrylate, and methacrylic esters such as methylmethacrylate containing the inhibitors to be compared was subjected to a viscosity test which was carried out as follows:

In a 100 cc. Erlenmeyer flask, an inhibitor and 0.025 gram of 2,2'-azobisisobutylonitrile is dissolved in 60 grams of acrylic ester or methacrylic ester. This flask is placed in a thermostat maintained at 60° C. The viscosity of 5 cc. samples taken at fixed intervals from the flask is measured by an Ostwalt viscosimeter. When the viscosity fails to rise abruptly within 6 hours, the inhibitor is considered effective.

The above test was applied to methyl acrylate, ethyl acrylate, butyl acrylate and methylmethacrylate containing the following inhibitors.

Hydroquinone monomethyl ether
Thiosemicarbazide
Acetonethiosemicarbazone
Acetylthiosemicarbazide
Semicarbazide
Acetonesemicarbazone
Phenylsemicarbazide
Acetaldehydethiosemicarbazone The table hereinunder mentioned shows the concentrations as well as the effect upon the acrylic esters and methacrylic esters.

*Comparison of inhibitors*

| Monomers | Inhibitors | Concentrations of inhibitors (p.p.m.) | Inhibited period (hour) |
|---|---|---|---|
| Methyl acrylate | Hydroquinone monomethyl ether | 50 | 2 |
| Do | do | 300 | [1] 6 |
| Do | Thiosemicarbazide | 30 | [1] 6 |
| Do | Acetonethiosemicarbazone | 25 | [1] 6 |
| Ethyl acrylate | do | 30 | [1] 6 |
| Butyl acrylate | Acetylthiosemicarbazide | 35 | [1] 6 |
| Methylmethacrylate | Thiosemicarbazide | 30 | [1] 6 |
| Do | Semicarbazide | 40 | [1] 6 |
| Do | Acetonesemicarbazone | 40 | [1] 6 |
| Do | Phenylsemicarbazide | 40 | [1] 6 |
| Do | Acetaldehydethiosemicarbazone | 40 | [1] 6 |

[1] Over.

The above data show that the present inhibitors are effective at lower concentrations than the conventional inhibitors of the prior art. In addition to this superiority in that a smaller amount of the inhibitors is necessary, the present inhibitors have the further advantages of negligible color formation. In addition to the above accelerated stability test carried out, it has been found that the present inhibitors are effective in prolonged storage under normal atmospheric conditions.

EXAMPLE 3

Effectiveness of the present inhibitors were investigated. Monomers to which the inhibitors were added weighed 100 g., respectively and were left to stand under atmospheric pressure, at room temperature for one year, except for vinylchloride in a bomb for one year, to observe changes of viscosity as well as appearance.

*Table*

| Monomers | Inhibitors | Conc. (p.p.m.) | Viscosity | Appearance |
|---|---|---|---|---|
| Acrylonitrile | Thiosemicarbazide | 30 | Unchanged | Unchanged. |
| Methacrylonitrile | Acetonethiosemicarbazone | 30 | do | Do. |
| Acrylic acid | Acetylthiosemicarbazide | 30 | do | Do. |
| Methacrylic acid | Semicarbazide | 40 | do | Do. |
| Ethacrylic acid | Acetonesemicarbazone | 40 | do | Do. |
| Methylmethacrylate | Acetaldehydesemicarbazone | 40 | do | Do. |
| Ethylmethacrylate | Acetaldehydethiosemicarbazone | 30 | do | Do. |
| Butylmethacrylate | Phenylsemicarbazide | 40 | do | Do. |
| Methylacrylate | Acetonethiosemicarbazone | 30 | do | Do. |
| Ethylacrylate | Thiosemicarbazide | 30 | do | Do. |
| Propylacrylate | Acetonesemicarbazone | 40 | do | Do. |
| Butylacrylate | Acetaldehydesemicarbazone | 40 | do | Do. |
| Styrene | Acetonethiosemicarbazone | 30 | do | Do. |
| p-Methylstyrene | Semicarbazide | 40 | do | Do. |
| Vinylacetate | Acetaldehydethiosemicarbazone | 30 | do | Do. |
| Vinylchloride | Acetaldehydesemicarbazone | 40 | do | Do. |
| Vinylidenechloride | Semicarbazide | 40 | do | Do. |
| Vinylsulfonic acid | Phenylsemicarbazide | 40 | do | Do. |
| Methallylsulfonic acid | Acetonethiosemicarbazone | 30 | do | Do. |
| p-Styrene sulfonic acid | Thiosemicarbazide | 30 | do | Do. |
| 2-methyl-5-vinyl pyridine | do | 30 | do | Do. |
| 4-vinylpyridine | Acetaldehydethiosemicarbazone | 30 | do | Do. |
| N,N-dimethylaminoethylmethacrylate | Semicarbazide | 40 | do | Do. |

It will be seen from the above table that lower amount of the present inhibitors than conventional ones is sufficient to stabilize the various polymerizable organic monomers. Furthermore, the present inhibitors do not color the monomers at all.

What I claim is:

1. A composition consisting essentially of a nitrile compound selected from the group consisting of acrylonitrile, methacrylonitrile and dimethylacrylonitrile, and 0.5 to 2,000 p.p.m. of at least one stabilizer selected from the group consisting of acetonethiosemicarbazone, acetophenonethiosemicarbazone, acetaldehydethiosemicarbazone, acetylthiosemicarbazide, phenylthiosemicarbazide, formylthiosemicarbazide, carbaminylthiosemicarbazide, thiosemicarbazide, acetonesemicarbazone, acetaldehydesemicarbazone, acetylsemicarbazide, phenylsemicarbazide, iononesemicarbazone and semicarbazide.

2. A composition comprising acrylonitrile and 1 to 50 p.p.m. of acetonethiosemicarbazone.

3. A composition comprising acrylonitrile and 1 to 50 p.p.m. of thiosemicarbazide.

4. A composition comprising acrylonitrile and 1 to 50 p.p.m. of acetaldehydethiosemicarbazone.

5. A method of stabilizing a nitrile compound selected from the group consisting of acrylonitrile, methacrylonitrile and dimethylacrylonitrile consisting of adding to said compound 0.5 to 2,000 p.p.m. of at least one stabilizer selected from the group consisting of acetonethiosemicarbazone, acetophenonethiosemicarbazone, acetaldehydethiosemicarbazone, acetylthiosemicarbazide, phenylthiosemicarbazide, formylthiosemicarbazide, carbaminylthiosemicarbazide, thiosemicarbazide, acetonesemicarbazone, acetaldehydesemicarbazone, acetophenonesemicarbazone, acetylsemicarbazide, phenylsemicarbazide, iononesemicarbazide and semicarbazide.

6. A method according to claim 5, wherein 1 to 50 p.p.m. of acetonethiosemicarbazone is added to acrylonitrile.

7. A method according to claim 5, wherein 1 to 50 p.p.m. of thiosemicarbazide is added to acrylonitrile.

8. A method according to claim 5, wherein 1 to 50 p.p.m. of acetaldehydethiosemicarbazone is added to acrylonitrile.

References Cited by the Examiner
UNITED STATES PATENTS

| | | | |
|---|---|---|---|
| 2,299,128 | 10/1942 | Codd et al. | 252—403 X |
| 2,328,190 | 8/1943 | Burk et al. | 252—402 X |
| 2,353,690 | 7/1944 | Clarkson et al. | 252—42 X |
| 2,396,156 | 3/1946 | Clarkson | 252—402 XR |

CHARLES B. PARKER, *Primary Examiner.*

JOSEPH P. BRUST, *Assistant Examiner.*